(12) United States Patent
Chiu et al.

(10) Patent No.: US 10,913,188 B2
(45) Date of Patent: Feb. 9, 2021

(54) ANTI-SHOCK PAD AND RELATED MANUFACTURING METHOD

(71) Applicant: National Chung-Shan Institute of Science and Technology, Taoyuan (TW)

(72) Inventors: Chun-Wei Chiu, New Taipei (TW); Teh-Long Lai, Taoyuan (TW); Shyh-Chi Wu, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 183 days.

(21) Appl. No.: 16/378,567

(22) Filed: Apr. 9, 2019

(65) Prior Publication Data

US 2019/0308348 A1    Oct. 10, 2019

(30) Foreign Application Priority Data

Apr. 9, 2018    (TW) .............................. 107112178 A

(51) Int. Cl.
  *C08L 23/06* (2006.01)
  *B29C 44/34* (2006.01)
  (Continued)

(52) U.S. Cl.
  CPC ........ *B29C 44/3476* (2013.01); *B29C 44/348* (2013.01); *B29C 44/56* (2013.01); *C08K 3/013* (2018.01); *C08K 3/36* (2013.01); *C08K 5/10* (2013.01); *C08L 9/06* (2013.01); *C08L 23/06* (2013.01); *C08L 23/0853* (2013.01);
  (Continued)

(58) Field of Classification Search
  CPC ... B29C 44/3476; B29C 44/348; B29C 44/56; B29C 44/5627; B29C 44/3415; F41H 1/02; C08L 23/06; C08L 23/0853; C08L 53/00; C08L 9/06; C08L 2312/08; C08L 2205/035; C08L 2207/04; C08L 2203/14; C08K 3/013; C08K 3/36; C08K 5/10; C08K 2023/06; B29L 2031/768
  See application file for complete search history.

(56) References Cited

U.S. PATENT DOCUMENTS

2007/0029690 A1*  2/2007  Green ..................... D01F 8/16
                                                              264/50
2017/0215522 A1*  8/2017  Tateishi ............... A43B 13/187

FOREIGN PATENT DOCUMENTS

JP        H11-206406 A   *  8/1999

* cited by examiner

*Primary Examiner* — Kara B Boyle
(74) *Attorney, Agent, or Firm* — Winston Hsu

(57) ABSTRACT

The present invention provides an anti-shock pad, which includes: a board-shaped compound material structure, manufactured by mixing a composition and foam molding the composition, wherein the composition comprises: a main substrate, having a proportion of 50 wt % to 80 wt % of total weight of the composition, comprising: a vinyl acetate; and an ethylene-vinyl acetate; a secondary substrate, having a proportion of 10 wt % to 40 wt % of the total weight of the composition, comprising: a polyethylene; a styrene butadiene rubber; and a thermoplastic elastomer; and an additive, having a proportion of 1 wt % to 20 wt % of the total weight of the composition; wherein a density of the anti-shock pad is between 0.20 and 0.50, and a foaming ratio of the anti-shock pad is between 20 and 40. The present invention is also related to a method of manufacturing the anti-shock pad.

10 Claims, 2 Drawing Sheets

Step 1: mixing the composition as mentioned in Embodiment 1-1 — S101

Step 2: foam molding the mixed composition in a mold, to obtain a board-shaped compound material structure — S102

Step 3: cutting the obtained board-shaped compound material structure, to obtain an anti-shock pad — S103

(51) Int. Cl.
*C08L 9/06* (2006.01)
*F41H 1/02* (2006.01)
*C08L 23/08* (2006.01)
*C08K 3/013* (2018.01)
*C08L 53/00* (2006.01)
*C08K 3/36* (2006.01)
*C08K 5/10* (2006.01)
*B29C 44/56* (2006.01)

(52) U.S. Cl.
CPC ............... *C08L 53/00* (2013.01); *F41H 1/02* (2013.01); *C08L 2205/035* (2013.01); *C08L 2207/04* (2013.01); *C08L 2312/08* (2013.01)

ANTI-SHOCK PAD AND RELATED MANUFACTURING METHOD

BACKGROUND OF THE INVENTION

1. Field of the Invention

The present invention relates to an anti-shock pad, and more particularly, to an anti-shock pad having a board-shaped compound material structure. In addition, the present invention also relates to a method of manufacturing said anti-shock pad.

2. Description of the Prior Art

A wearable protective equipment (such as a helmet, bullet-proof vest and bullet-proof mask) is able to provide a degree of protection for the wearer (such as a soldier, enforcement staff, security service personnel) to reduce the harm from bullets or splinters on the wearer, and thus has considerable importance.

In addition, due to development of modern industries and extreme and leisure sports, how to deal with vibration and shock has become a severe problem to be solved urgently in various fields. The vibration and shock may result in problems such as reduced operating accuracy, decreased product life, dangers on the staff, and environmental pollution. Therefore, at the present, how to absorb or cut down the vibration and shock is an essential issue to be solved.

Currently available anti-shock pads generally have problems of high stickiness of rubber, bad oil resistance, poor anti-vibration performance, poor anti-shock performance, low anti-fatigue performance, and high costs, etc. Although the shear thickening fluid (STF) has satisfactory anti-vibration and shock-resistance performance, the liquid state significantly reduces its value on practical applications.

The STF is a non-Newtonian fluid. Its special feature is that, the viscosity of a general complex fluid may fall when a shearing force is exerted on the complex fluid, while the viscosity of the STF is proportional to its received shearing force within a specific range. This special feature indicates why the STF becomes harder after being subject to an external force.

A general STF is a colloid composed of polyethylene glycol and silicon dioxide. However, due to strong hygroscopicity of the polyethylene glycol, the colloid will be unstable and have low shear resistance.

The conventional method of manufacturing an anti-shock pad is agitating the substrate and various additive compositions, mixing in a predetermined temperature, and then performing foam molding in a specific mold to obtain the anti-shock pad. Based on the differences of the material of substrates and additives, the quality, performance and manufacture costs of the final products may be influenced, and environment protection problems may arise. Therefore, there is still room for improvement over the currently available anti-shock pads.

SUMMARY OF THE INVENTION

Colloid solution is a shear thickening fluid (STF). Due to its fluid feature, the colloid solution should be spread on a carrier in prior applications, which therefore reduces the possible weight percentage of STF in the anti-shock pad (at most 20% wt). According to the technical feature of the present invention, the shear thickening solution may be a composite foamed and solidified directly, to overcome the limitation that the solution should be spread on the carrier in prior applications; hence, the anti-shock pad can be manufactured in its entirety, and the problem of the percentage of effective materials mentioned above may be prevented, so as to strengthen the anti-shock effect.

During the manufacture process of the anti-shock pad of the present invention, the process technology of the vinyl acetate based complex colloid is applied to scatter the energies on the compound of colloid and vinyl acetate, with the usage of molds to foam, shape, and solidify to generate a desired shape, and then adapted to requirements of anti-shock structure to accomplish the board-shaped compound material structure. This board-shaped compound material structure is further cut to generate the wanted anti-shock pads. The anti-shock pads of the present invention may be widely applied to protective gear of sport equipment, wrapping materials of precision instruments and 3C products, and the like. In addition, the anti-shock pads of the present invention are applicable to manufacture of anti-shock and protective products, especially to the wearable protective equipment such as manufacture of bullet-proof vest.

One of the purposes of the present invention is to provide an anti-shock pad and its manufacturing method, in order to provide satisfactory shock resistance features for wearable protective equipment using the anti-shock pad.

In order to achieve the above purpose and other purposes, the present invention provides an anti-shock pad, which comprises: a board-shaped compound material structure, manufactured by mixing a composition and foam molding the composition, wherein the composition comprises: a main substrate, having a proportion of 50 wt % to 80 wt % of total weight of the composition, comprising: a vinyl acetate and an ethylene-vinyl acetate; a secondary substrate, having a proportion of 10 wt % to 40 wt % of the total weight of the composition, comprising: a polyethylene; a styrene butadiene rubber; and a thermoplastic elastomer; and an additive, having a proportion of 1 wt % to 20 wt % of the total weight of the composition; wherein a density of the anti-shock pad is between 0.20 and 0.50, and a foaming ratio of the anti-shock pad is between 20 and 40.

In an embodiment of the present invention, the secondary substrate further comprises: a silicon binary oxide material, comprising: silicon dioxide particles; and a polydimethylsiloxane.

In an embodiment of the present invention, the composition comprises the silicon binary oxide material from 6 wt % to 18 wt %.

In an embodiment of the present invention, in the ethylene-vinyl acetate, a content of the vinyl acetate is 60 wt % to 90 wt % of total weight of the ethylene-vinyl acetate.

In an embodiment of the present invention, the additive is selected from a group consisting of a foaming agent, a foaming auxiliary, a crosslinking agent, a crosslinking auxiliary, color particles and a filler.

In an embodiment of the present invention, the composition comprises the vinyl acetate from 5 wt % to 10 wt %, and the ethylene-vinyl acetate from 40 wt % to 63 wt %.

In an embodiment of the present invention, the composition comprises the polyethylene from 6 wt % to 18 wt %, the styrene butadiene rubber from 3 wt % to 6 wt %, and the thermoplastic elastomer from 2 wt % to 4 wt %.

In an embodiment of the present invention, the thermoplastic elastomer is a styrene ethylene butylene styrene block copolymer (SEBS).

In order to achieve the above purpose and other purposes, the present invention further provides a method of manufacturing an anti-shock pad, which comprises: (1) mixing a composition, wherein the composition comprises: a main substrate, having a proportion of 50 wt % to 80 wt % of total weight of the composition, the main substrate comprising: a vinyl acetate and an ethylene-vinyl acetate; a secondary substrate, having a proportion of 10 wt % to 40 wt % of the total weight of the composition, the secondary substrate comprising: a polyethylene; a styrene butadiene rubber; and a thermoplastic elastomer; and an additive, having a proportion of 1 wt % to 20 wt % of the total weight of the composition; (2) foam molding the mixed composition in a mold, to obtain a board-shaped compound material structure; and (3) cutting the obtained board-shaped compound material structure to obtain the anti-shock pad, wherein a density of the anti-shock pad is between 0.20 and 0.50, and a foaming ratio of the anti-shock pad is between 20 and 40.

In an embodiment of the present invention, the secondary substrate further comprises: a silicon binary oxide material, comprising: silicon dioxide particles; and a polydimethylsiloxane.

Accordingly, the anti-shock pad and its manufacturing method of the present invention may provide satisfactory shock resistance features for wearable protective equipment using the anti-shock pad.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
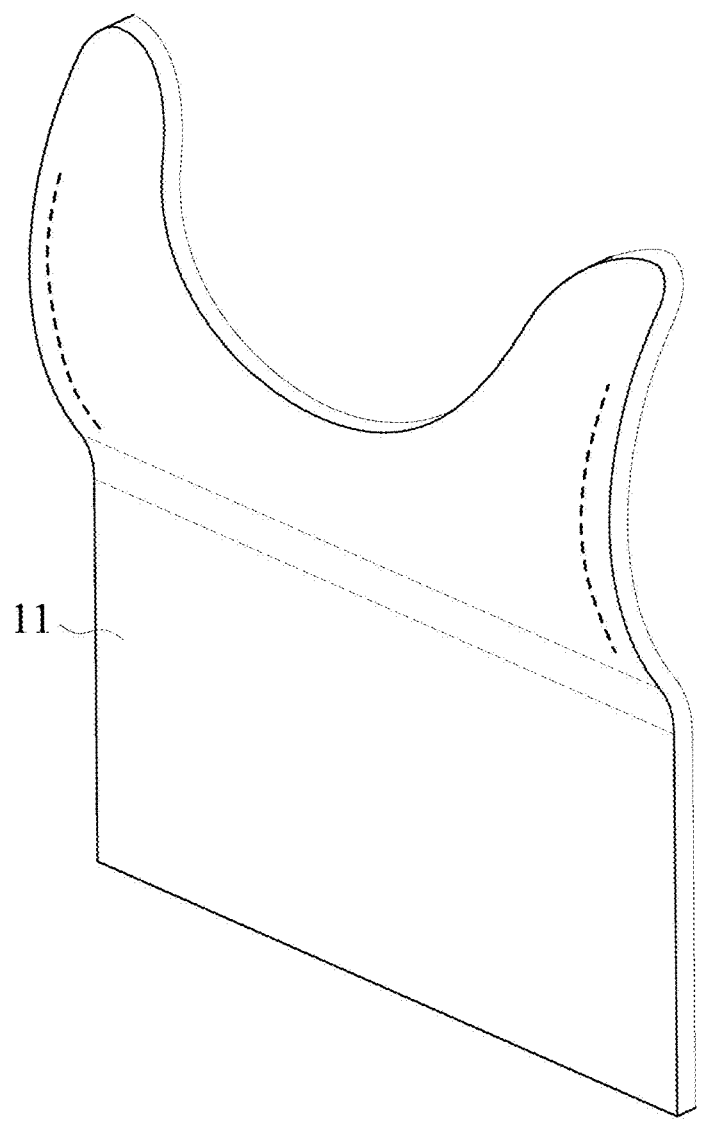
FIG. 1 is a schematic diagram of an anti-shock pad according to an embodiment of the present invention.

In order to fully understand the purpose, feature and efficacy of the present invention, the present invention is illustrated in detail using the follow-up specific embodiments together with the figures, as described below:

FIG. 1 is a schematic diagram of an anti-shock pad 10 according to an embodiment of the present invention. As shown in FIG. 1, the anti-shock pad 10 of the present invention includes a board-shaped compound material structure 11, which is manufactured by mixing a composition and foam molding the composition. Wherein, the composition may be manufactured using the method illustrated in the following Embodiment 1.

Embodiment 1: The Composition for Manufacturing the Board-Shaped Compound Material Structure The composition for manufacturing the board-shaped compound material structure in Embodiment 1-1~1-3 is prepared according to the prescription ratio as shown in Table 1, but the present invention is not limited thereto.

TABLE 1

|  |  | Embodiment 1-1 | Embodiment 1-2 | Embodiment 1-3 |
|---|---|---|---|---|
| Main substrate | VA (%) | 10 | 6 | 6 |
|  | EVA (%) | 40 | 54 | 58 |
| Secondary substrate | PE (%) | 18 | 15 | 15 |
|  | SBR (%) | 6 | 3 | 3 |
|  | SEBS (%) | 4 | 2 | 2 |
|  | Silicon binary oxide material (%) | 12 | 10 | 6 |
| Additives | Foaming agent (%) | 2.5 | 2.5 | 2.5 |
|  | Foaming auxiliary (%) | 1.5 | 1.5 | 1.5 |
|  | Crosslinking agent (%) | 0.8 | 0.8 | 0.8 |
|  | Crosslinking auxiliary (%) | 0.7 | 0.7 | 0.7 |
|  | Color particles (%) | 0.5 | 0.5 | 0.5 |
|  | Filler (%) | 4 | 4 | 4 |

The ratios of each component in Table 1 are denoted by weight percentage. Wherein, VA stands for vinyl acetate; EVA stands for ethylene-vinyl acetate; PE stands for polyethylene; SBR stands for styrene butadiene rubber; SEBS stands for styrene ethylene butylene styrene block copolymer, which is a thermoplastic elastomer. The abovementioned materials may be purchased from the market.

The manufacturing method of the silicon binary oxide material included in the secondary substrate in Embodiment 1-1~1-3 is described in Taiwan Publication No. 201602244, which is incorporated herein in its entirety by reference.

The above silicon binary oxide material is manufactured by the following method:

Step One: Obtaining silicon dioxide particles between 50 nm~500 μm and polydimethylsiloxane with molecular weight between 200~5000, mixed and stirred with appropriate amount of additives, to form a mix solution having silicon dioxide and polydimethylsiloxane; letting the mix solution stand, allowing the tiny bubbles in the mix solution to distribute uniformly to form the raw material of colloid solution; wherein the mixing ratio of the silicon dioxide particles and polydimethylsiloxane is between 12~60% wt.

Step Two: Joining appropriate amount of crosslinking agent with the raw material of colloid solution and well mixing to become plastic material of colloid solution, wherein the crosslinking agent may be siloxane monomer or its high molecular polymer (such as PU or EVA).

Step Three: Filling the plastic material of colloid solution in the mold, where the mold is manufactured using professional techniques such as simulation and analysis of integrating shock stress and structural design according to requirements of shock energy absorption, and its material may be a metal resistant to more than 200° C. and its surface may be passivated to facilitate mold release; and heating and solidifying the plastic material of colloid solution to form the silicon binary oxide material, wherein the heating temperature is between 80~120° C. and the heating time is between 2~4 hours.

Embodiment 2: Manufacturing Method of the Anti-Shock Pad

Embodiment 2-1

Figure 2:
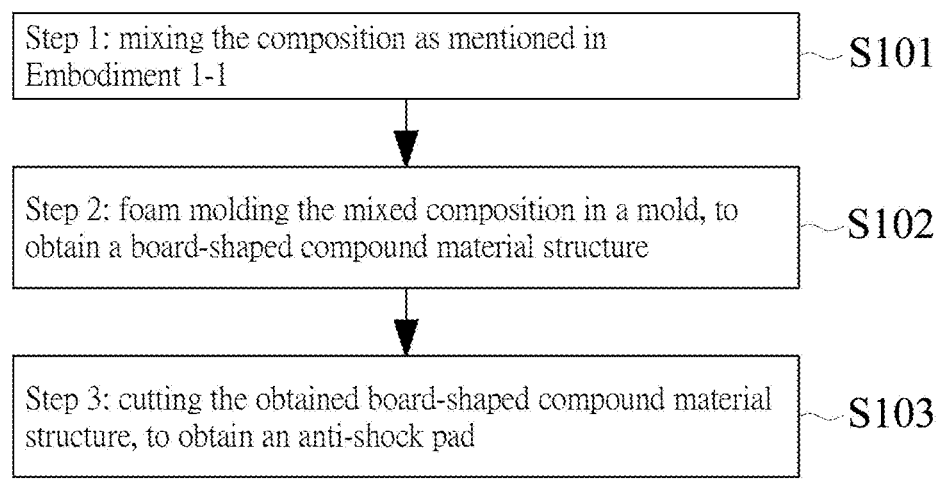
FIG. 2 is a flowchart of manufacturing method of the anti-shock pad according to an embodiment of the present invention.

FIG. 2 is a flowchart of manufacturing method of the anti-shock pad according to an embodiment of the present invention. As shown in FIG. 2, the manufacturing method of the board-shaped compound material structure in Embodiment 2-1 includes steps of: Step One S101, mixing the composition as mentioned in Embodiment 1-1; Step Two S102, foam molding the above mixed composition in a mold, to obtain a board-shaped compound material structure; and Step Three S103, cutting the board-shaped compound material structure obtained in Step Two S102, to obtain the anti-shock pad. In the present embodiment, the board-shaped compound material structure is cut to generate the anti-shock pad having thickness 20 mm to comply with the configuration of female bullet-proof vest, for subsequent processing and testing.

In Step One S101 as mentioned above, the mixing method and process conditions do not have any special limitation, as long as every component in the composition of Embodiment 1-1 can be fully mixed. Preferably, the composition of Embodiment 1-1 may be put in a kneader to perform a first-phase mixing to generate a plastic mixture, where the process temperature is preferably controlled to be between 80° C.~150° C., and the mixing time is preferably between 15~30 minutes. Afterwards, the plastic mixture is further rolled and mixed with twin rollers, where the process temperature is preferably controlled to be between 80° C.~130° C., and the mixing time is preferably between 3~6 minutes.

In Step Two S102 as mentioned above, the foam molding method and process conditions do not have any special limitation, and conventional foam molding method in the related art may be applied. Preferably, in a one-time foam molding, a batch-type oil hydraulic press machine is applied to perform crosslink foaming, where the process temperature is preferably controlled to be between 130° C.~160° C., the foam molding time is preferably between 30~50 minutes, and the foam limit pressure of the oil hydraulic press machine is preferably between 150 kg/cm²~250 kg/cm². By controlling the above process parameters, the density of the board-shaped compound material structure may be controlled to be between 0.20~0.50, and the foaming ratio may be controlled to be between 20~40, so as to obtain anti-shock pads having identical features in the follow-up Step Three S103.

In Step Three S103 as mentioned above, the anti-shock pads after cutting do not have any special limitation on thickness and shape. The persons with ordinary skill in the related art may cut the board-shaped compound material structure obtained in Step Two S102 to generate anti-shock pads having any thickness and shape, to comply with the shapes of various wearable protective equipment (such as the male bullet-proof vest, female bullet-proof vest, helmet, bullet-proof mask, kneecap, and elbow pad). Preferably, the thickness of anti-shock pads after cutting is between 10~30 mm.

Embodiment 2-2

The manufacturing method of the anti-shock pad in Embodiment 2-2 is substantially identical to the manufacturing method in Embodiment 2-1, except that the mixing operation in Step One is performed on the composition of Embodiment 1-2.

Embodiment 2-3

The manufacturing method of the anti-shock pad in Embodiment 2-3 is substantially identical to the manufacturing method in Embodiment 2-1, except that the mixing operation in Step One is performed on the composition of Embodiment 1-3.

The Test Example

According to the SATRA TM142 test method, an energy absorption test is performed on the anti-shock pads of Embodiments 2-1~2-3 in different temperatures, respectively. The test results are as Table 2 shown below.

TABLE 2

| | | | Test result (G) | | |
|---|---|---|---|---|---|
| Embodiment | Density | Foaming ratio | Normal temp. 25° C. | Low temp. −10° C. | High temp. 40° C. |
| 2-1 | 0.27 | 30 | 14 | 36.5 | 13 |
| 2-2 | 0.27 | 30 | 15 | 29 | 11 |
| 2-3 | 0.4~0.42 | 30 | 15 | 37 | 14 |

As shown in Table 2, under the energy absorption test performed in different temperatures, the anti-shock pads of Embodiments 2-1~2-3 are feasible in environmental temperatures from −10° C. to 40° C. The anti-shock feature appears throughout these temperatures, and is optimal in high temperature.

According to 20 kN (test process of EN 1621-1:2012 motorcyclists' protective clothing against mechanical impact), under 50 J impact energies, a test is performed on the anti-shock pads of Embodiments 2-1~2-3, respectively. The test results are as Table 3 shown below.

TABLE 3

| Embodiment | Density | Foaming ratio | Test result (KN) | Passing level |
|---|---|---|---|---|
| 2-1 | 0.27 | 30 | P1: 28.5<br>P2: 30.7<br>P3: 30.3 | Level 1 |
| 2-2 | 0.27 | 30 | P1: 9.01<br>P2: 9.12<br>P3: 9.03 | Level 2 |
| 2-3 | 0.4~0.42 | 30 | P1: 10.4<br>P2: 10.0<br>P3: 10.3 | Level 2 |

As can be seen from the above test results, the anti-shock pads of the present invention may comply with the standard of low g-value energy absorption by controlling the density to be between 0.20~0.50 and controlling the foaming ratio to be between 20~40. Accordingly, the anti-shock pads of the present invention are applicable to design of sporting goods (such as shoe-pads, clubs or rackets), medical protection (such as protective clothing for older, sick or disabled persons), or other related applications of various anti-shock requirements (such as helmets or car bumpers). In addition, the anti-shock pads of the present invention may also be applied as the anti-shock pads in the wearable protective equipment such as the male bullet-proof vest, female bullet-proof vest, helmet, bullet-proof mask, knee cap, and elbow pad.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An anti-shock pad, comprising:
a board-shaped compound material structure, manufactured by mixing a composition and foam molding the composition, wherein the composition comprises:
   a main substrate, having a proportion of 50 wt % to 80 wt % of total weight of the composition, comprising:
      a vinyl acetate; and
      an ethylene-vinyl acetate;
   a secondary substrate, having a proportion of 10 wt % to 40 wt % of the total weight of the composition, comprising:
      a polyethylene;
      a styrene butadiene rubber; and
      a thermoplastic elastomer; and
   an additive, having a proportion of 1 wt % to 20 wt % of the total weight of the composition;
wherein a density of the anti-shock pad is between 0.20 and 0.50, and a foaming ratio of the anti-shock pad is between 20 and 40.

2. The anti-shock pad of claim 1, wherein the secondary substrate further comprises:
   a silicon binary oxide material, comprising:
      silicon dioxide particles; and
      a polydimethylsiloxane.

3. The anti-shock pad of claim 2, wherein the composition comprises the silicon binary oxide material from 6 wt % to 18 wt %.

4. The anti-shock pad of claim 1, wherein in the ethylene-vinyl acetate, a content of the vinyl acetate is 60 wt % to 90 wt % of total weight of the ethylene-vinyl acetate.

5. The anti-shock pad of claim 1, wherein the additive is selected from a group consisting of a foaming agent, a foaming auxiliary, a crosslinking agent, a crosslinking auxiliary, color particles and a filler.

6. The anti-shock pad of claim 1, wherein the composition comprises the vinyl acetate from 5 wt % to 10 wt %, and the ethylene-vinyl acetate from 40 wt % to 63 wt %.

7. The anti-shock pad of claim 1, wherein the composition comprises the polyethylene from 6 wt % to 18 wt %, the styrene butadiene rubber from 3 wt % to 6 wt %, and the thermoplastic elastomer from 2 wt % to 4 wt %.

8. The anti-shock pad of claim 1, wherein the thermoplastic elastomer is a styrene ethylene butylene styrene block copolymer.

9. A method of manufacturing an anti-shock pad, comprising:
(1) mixing a composition, wherein the composition comprises:
   a main substrate, having a proportion of 50 wt % to 80 wt % of total weight of the composition, the main substrate comprising:
      a vinyl acetate; and
      an ethylene-vinyl acetate;
   a secondary substrate, having a proportion of 10 wt % to 40 wt % of the total weight of the composition, the secondary substrate comprising:
      a polyethylene;
      a styrene butadiene rubber; and
      a thermoplastic elastomer; and
   an additive, having a proportion of 1 wt % to 20 wt % of the total weight of the composition;
(2) foam molding the mixed composition in a mold, to obtain a board-shaped compound material structure; and
(3) cutting the obtained board-shaped compound material structure to obtain the anti-shock pad;
wherein a density of the anti-shock pad is between 0.20 and 0.50, and a foaming ratio of the anti-shock pad is between 20 and 40.

10. The method of claim 9, wherein the secondary substrate further comprises:
   a silicon binary oxide material, comprising:
      silicon dioxide particles; and
      a polydimethylsiloxane.

* * * * *